US012603444B2

(12) United States Patent
Minamitani

(10) Patent No.: US 12,603,444 B2
(45) Date of Patent: Apr. 14, 2026

(54) ANTENNA MODULE AND COMMUNICATION DEVICE INCLUDING THE SAME

(71) Applicant: Murata Manufacturing Co., Ltd., Nagaokakyo (JP)

(72) Inventor: Natsumi Minamitani, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 124 days.

(21) Appl. No.: 18/793,992

(22) Filed: Aug. 5, 2024

(65) Prior Publication Data

US 2025/0007182 A1 Jan. 2, 2025

Related U.S. Application Data

(63) Continuation of application No. PCT/JP2022/040889, filed on Nov. 1, 2022.

(30) Foreign Application Priority Data

Feb. 16, 2022 (JP) ................................ 2022-022338

(51) Int. Cl.
*H01Q 21/28* (2006.01)
*H01Q 5/307* (2015.01)

(52) U.S. Cl.
CPC ............ *H01Q 21/28* (2013.01); *H01Q 5/307* (2015.01)

(58) Field of Classification Search
CPC ............................... H01Q 21/28; H01Q 5/307
See application file for complete search history.

(56) References Cited

U.S. PATENT DOCUMENTS

2021/0075088 A1 3/2021 Edwards et al.

FOREIGN PATENT DOCUMENTS

JP 2014-529971 A 11/2014
WO 2020/170722 A1 8/2020

OTHER PUBLICATIONS

International Search Report and Written Opinion mailed on Jan. 24, 2023, received for PCT Application PCT/JP2022/040889, filed on Nov. 1, 2022, 09 pages including English Translation.

*Primary Examiner* — Graham P Smith
(74) *Attorney, Agent, or Firm* — XSENSUS LLP

(57) ABSTRACT

An antenna module includes first and second radiating elements, and a substrate including a first main surface facing away from a second main surface. The first radiating element is closer to the first main surface than to the second main surface. The second radiating element is in a first antenna disposition member. A feed circuit supplies high-frequency signals to the first and second radiating elements. The first antenna disposition member has a first disposition surface on which the substrate is disposed and a first intersecting surface intersecting the first disposition surface. The second main surface is joined to the first disposition surface, and a feed wiring line electrically connecting the first radiating element or the second radiating element to the feed circuit includes a wiring line spanning the substrate and the first antenna disposition member in a first joint portion between the second main surface and the first disposition surface.

20 Claims, 17 Drawing Sheets

ANTENNA MODULE AND COMMUNICATION DEVICE INCLUDING THE SAME

CROSS-REFERENCE TO RELATED APPLICATIONS

This application is a continuation of international application no. PCT/JP2022/040889, filed Nov. 1, 2022, and which claims priority to Japanese application no. 2022-022338, filed Feb. 16, 2022. The entire contents of both prior applications are hereby incorporated by reference.

TECHNICAL FIELD

The present disclosure relates to an antenna module and a communication device including the antenna module.

BACKGROUND ART

An antenna module in may have an antenna disposed on each of two surfaces having different normal directions of a substrate bent in a housing. The antenna module can radiate radio waves in two directions from the substrate.

SUMMARY

Technical Problem

In the antenna module described above, the substrate is bent along two surfaces of the housing. Therefore, there is a concern that a feed wiring line leading to an antenna in the substrate may break at a bent portion of the substrate. In particular, as the bend angle of the substrate is more acute to effectively utilize the volume inside the housing, a risk of breakage of the feed wiring line becomes higher.

The present disclosure addresses the problem described above and enables radiation of radio waves in two directions while avoiding a risk of breakage of the feed wiring line.

Solution to Problem

An antenna module according to a first aspect of the present disclosure includes a first radiating element; a second radiating element, a substrate having a first main surface and a second main surface facing away from each other in which the first radiating element is disposed closer to the first main surface than to the second main surface, a first antenna disposition member in which the second radiating element is disposed, and a feed circuit that supplies a high-frequency signal to the first radiating element and the second radiating element. The first antenna disposition member has a first disposition surface on which the substrate is disposed and a first intersecting surface that intersects the first disposition surface. The second main surface and the first disposition surface are joined to each other, and a feed wiring line that electrically connects the first radiating element or the second radiating element to the feed circuit includes a wiring line that spans the substrate and the first antenna disposition member in a first joint portion between the second main surface and the first disposition surface.

Advantageous Effects

The antenna module according to the present disclosure can radiate radio waves in two directions while avoiding a risk of breakage of the feed wiring line.

DESCRIPTION OF EMBODIMENTS

Figure 1:
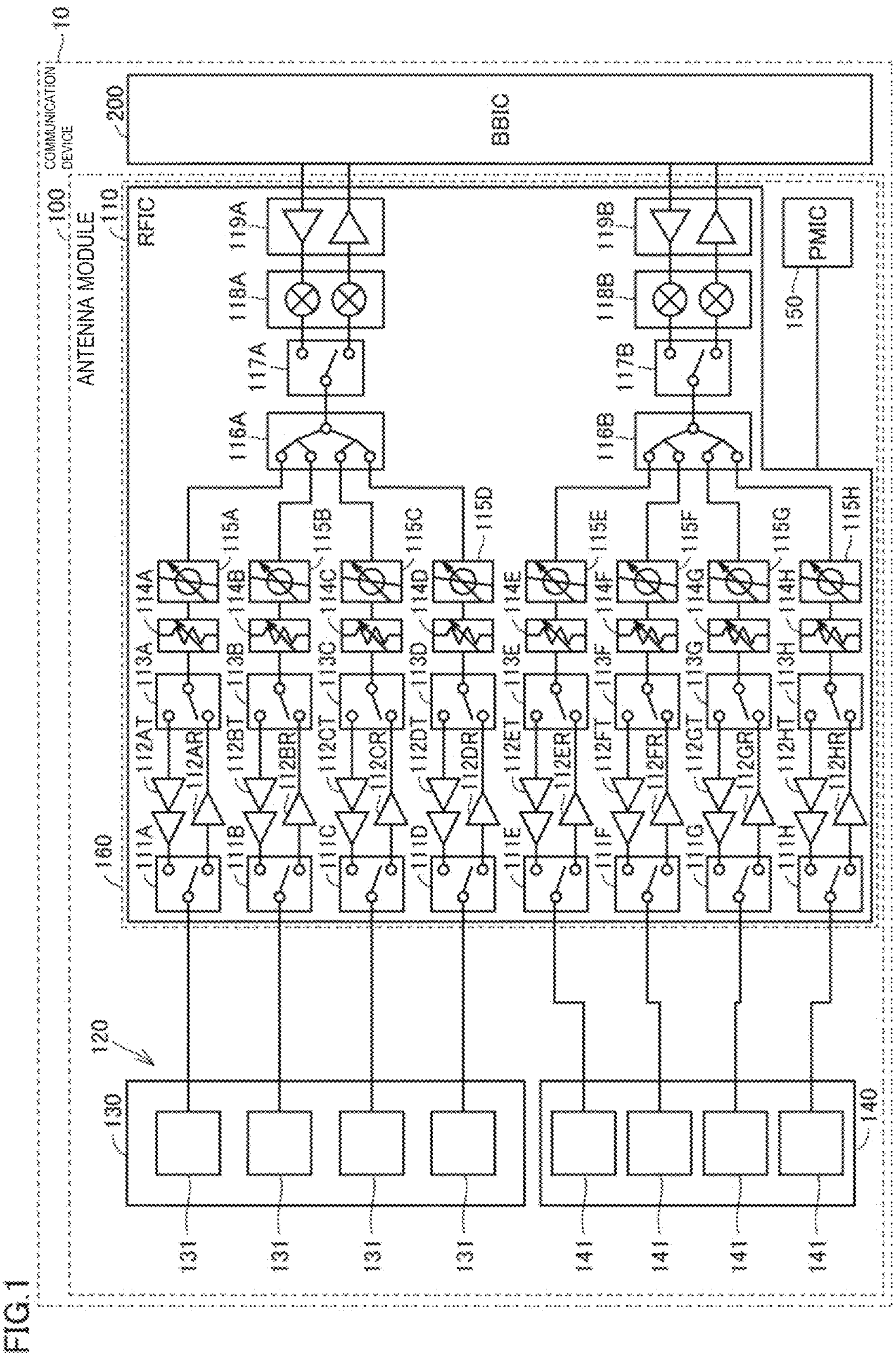
FIG. 1 is a block diagram of a communication device to which an antenna module according to exemplary embodiment 1 is applied.

Embodiments of the present disclosure will be described in detail below with reference to the drawings. It should be noted that identical or equivalent components in the drawings are denoted by identical reference numerals to omit the description.

Embodiment 1

(Basic Structure of Communication Device)

FIG. 1 is a block diagram of a communication device 10 to which an antenna module 100 according to exemplary embodiment 1 is applied. The communication device 10 is, for example, a mobile terminal, such as a mobile phone, a smartphone, or a tablet, or a personal computer having a communication function. An example of the frequency band of a radio wave used in the antenna module 100 according to the exemplary embodiment is a millimeter wave band centered at, for example, 28 GHZ, 39 GHZ, or 60 GHz. Radio waves in frequency bands other than the above are also applicable to the antenna module 100 according to the exemplary embodiment.

Referring to FIG. 1, the communication device 10 includes the antenna module 100 and a baseband integrated circuit (BBIC) 200 that constitutes a baseband signal processing circuit. The antenna module 100 includes a radio frequency integrated circuit (RFIC) 110, a power management integrated circuit (PMIC) 150, and an antenna device 120.

The RFIC 110 and the PMIC 150 are sealed in a system-in-package (SiP) 150. The PMIC 150 manages a power system of the RFIC 110. The RFIC 110 and the PMIC 150 are examples of feed circuits.

The communication device 10 up-converts, into a high-frequency signal, the signal transmitted from the BBIC 200 to the antenna module 100 and radiates the up-converted signal through the antenna device 120, and down-converts the high-frequency signal received through the antenna device 120 and processes the down-converted signal by using the BBIC 200.

The antenna device 120 includes a dielectric substrate 130 and an antenna disposition member 140. A radiating element 131 is disposed in the dielectric substrate 130. A radiating element 141 is disposed in the antenna disposition member 140. The radiating elements 131 and 141 are patch antennas having a substantially square flat-plate shape. The radiating element 131 is an example of the first radiating element, and the radiating element 141 is an example of the second radiating element.

The antenna disposition member 140 including the radiating element 141 is formed by a 3D printer, for example. However, the antenna disposition member 140, and the radiating element 141 it includes, may also be formed by any other process as will be recognized by one of ordinary skill in the art.

The number of radiating elements 131 disposed in the dielectric substrate 130 may be one or not less than two. Similarly, the number of radiating elements 141 disposed in the antenna disposition member 140 may be one or not less than two. FIG. 1 illustrates an example of the structural in which four radiating elements 131 are disposed in the dielectric substrate 130, and four radiating elements 141 are disposed in the antenna disposition member 140.

The RFIC 110 includes switches 111A to 111H, 113A to 113H, 117A, and 117B, power amplifiers 112AT to 112HT, low-noise amplifiers 112AR to 112HR, attenuators 114A to 114H, phase shifters 115A to 115H, signal combining/dividing units 116A and 116B, mixers 118A and 118B, and amplification circuits 119A and 119B.

Of these components, a circuit including the switches 111A to 111D, 113A to 113D, and 117A, the power amplifiers 112AT to 112DT, the low-noise amplifiers 112AR to 112DR, the attenuators 114A to 114D, the phase shifters 115A to 115D, the signal combining/dividing unit 116A, the mixer 118A, and the amplification circuit 119A is for a high-frequency signal radiated from the radiating element 131.

A circuit including the switches 111E to 111H, 113E to 113H, and 117B, the power amplifiers 112ET to 112HT, the low-noise amplifiers 112ER to 112HR, the attenuators 114E to 114H, the phase shifters 115E to 115H, the signal combining/dividing unit 116B, the mixer 118B, and the amplification circuit 119B is for a high-frequency signal radiated from radiating element 141.

When a high-frequency signal is transmitted, the switches 111A to 111H and 113A to 113H are switched to the power amplifiers 112AT to 112HT, and the switches 117A and 117B are connected to transmission amplifiers of the amplification circuits 119A and 119B. When a high-frequency signal is received, the switches 111A to 111H and 113A to 113H are switched to the low-noise amplifier 112AR to 112HR, and the switches 117A and 117B are connected to reception amplifiers of the amplification circuits 119A and 119B.

The signal transmitted from the BBIC 200 is amplified by the amplification circuits 119A and 119B and is up-converted by the mixers 118A and 118B. The transmitted signal, which is the up-converted high-frequency signal, is divided into four by the signal combiner/splitter 116A and 116B, and the four divided signals pass through corresponding signal paths and are fed to different radiating elements 131 and 141, respectively. The directivity of each of radio waves output from the radiating elements of dielectric substrates can be adjusted by individually adjusting the phase shifts of the phase shifters 115A to 115H disposed in the respective signal paths.

The reception signals, which are high-frequency signals received by the radiating elements 131 and 141, are transmitted to the RFIC 110, pass through four different signal paths, and are combined by the signal combining/dividing units 116A and 116B. The combined reception signals are down-converted by mixers 118A and 118B, amplified by the amplification circuits 119A and 119B, and transmitted to the BBIC 200.

The RFIC 110 is formed as, for example, a single-chip integrated circuit component having the circuit structure described above. Alternatively, devices (switches, power amplifiers, low-noise amplifiers, attenuators, and phase shifters) corresponding to the radiating elements 131 and 141 of the RFIC 110 may be formed as a single-chip integrated circuit component for each of the corresponding radiating elements.

(Positional Relationship Between Dielectric Substrate and Antenna Disposition Member)

Figure 2:
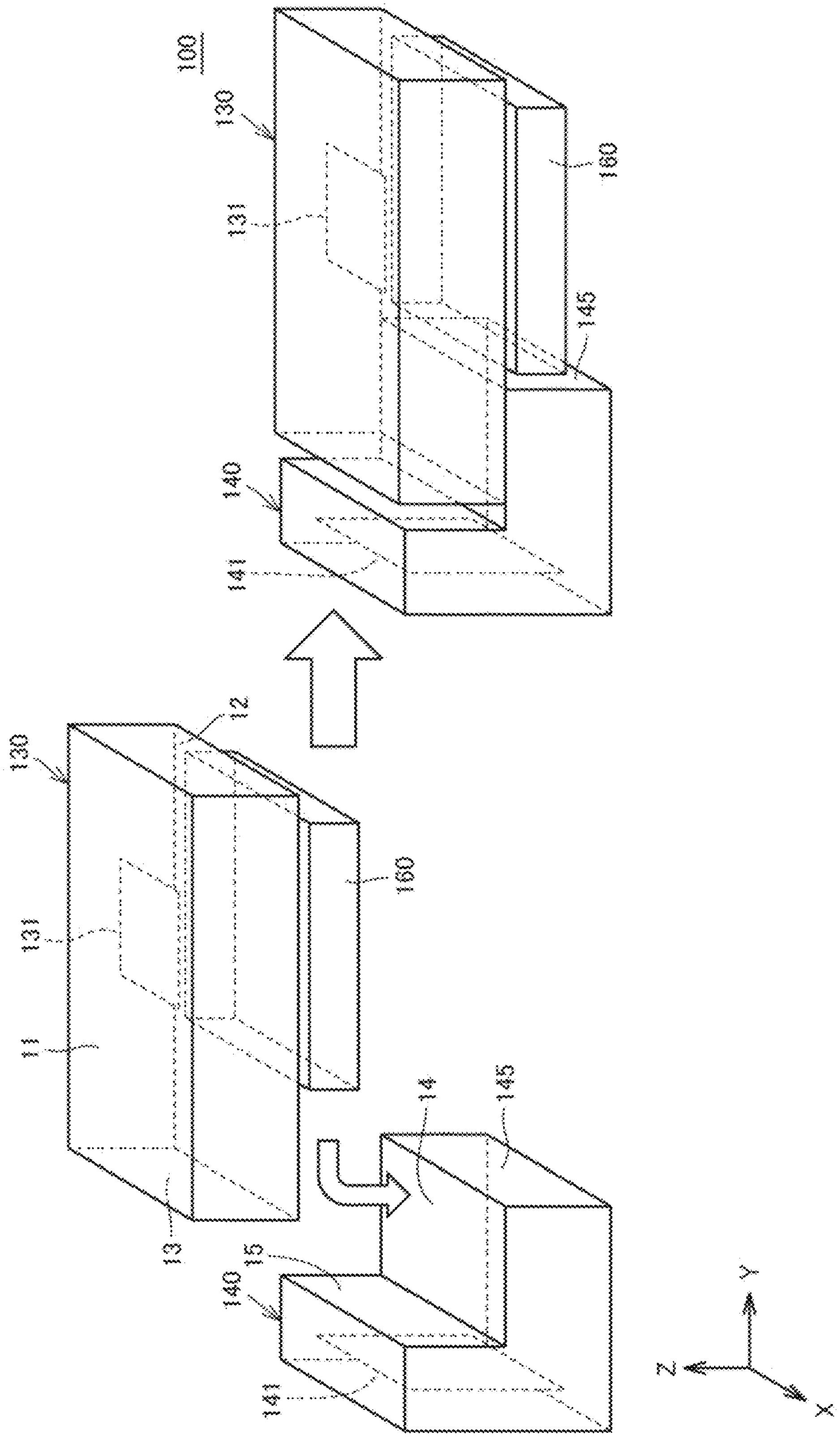
FIG. 2 is a perspective view of the antenna module according to exemplary embodiment 1.

FIG. 2 is a perspective view of the antenna module 100 according to exemplary embodiment 1. As illustrated in FIG. 2, the antenna module 100 includes a combination of the dielectric substrate 130, the antenna disposition member 140, and a SiP 160.

As illustrated in the drawing, the normal direction of the first main surface 11 of the dielectric substrate 130 is also referred to as a Z-axis direction, the longitudinal direction of the dielectric substrate 130 that is orthogonal to the Z-axis direction is also referred to as a Y-axis direction, and the direction orthogonal to the Y-axis direction and the Z-axis direction is also referred to as an X-axis direction. In addition, in the following description, the positive direction of the Z-axis may be referred to as an upper surface side and the negative direction of the Z-axis may be referred to as a lower surface side.

The radiating element 131 is disposed in the dielectric substrate 130. The radiating element 131 is disposed near the first main surface 11 so as to face the first main surface 11. It should be noted that FIG. 2 illustrates an example in which one radiating element 131 is disposed in the dielectric substrate 130. The SiP 160 is attached to a second main surface 12 of the dielectric substrate 130. The first main surface 11 and the second main surface 12 are parallel to each other.

The antenna disposition member 140 is formed in a substantially L-shape in plan view in the X-axis direction. The antenna disposition member 140 includes a disposition surface 14 on which a portion of the second main surface 12 of the dielectric substrate 130 is disposed and an intersecting surface 15 that intersects the disposition surface 14. In the exemplary embodiment, the intersection angle between the disposition surface 14 and the intersecting surface 15 is 90 degrees. However, the intersection angle is not limited to this angle. The antenna disposition member 140 has a projecting portion 145 that projects in the Y-axis direction from the intersecting surface 15. The disposition surface 14 is formed on the upper surface side of the projecting portion 145.

The radiating element 141 is disposed in the antenna disposition member 140. It should be noted that FIG. 2 illustrates an example in which one radiating element 141 is disposed in the antenna disposition member 140. The radiating element 141 is disposed at a position avoiding the projecting portion 145 so as to face the intersecting surface 15.

The antenna module 100 is formed by a portion of the second main surface 12 of the dielectric substrate 130 being disposed on the disposition surface 14 of the antenna disposition member 140. The disposition surface 14 of the antenna disposition member 140 is joined to a portion of the second main surface 12 of the dielectric substrate 130 by, for example, solder.

When a portion of the second main surface 12 of the dielectric substrate 130 is disposed on the disposition surface 14 of the antenna disposition member 140, the radiating element 131 and the radiating element 141 are disposed such that the direction of a radio wave radiated by the radiating element 131 differs from the direction of a radio wave radiated by the radiating element 141. In the antenna module 100, the intersecting surface 15 of the antenna disposition member 140 faces a side surface 13 of the dielectric substrate 130 with a gap therebetween.

(Structure of Antenna Module)

Figure 3:
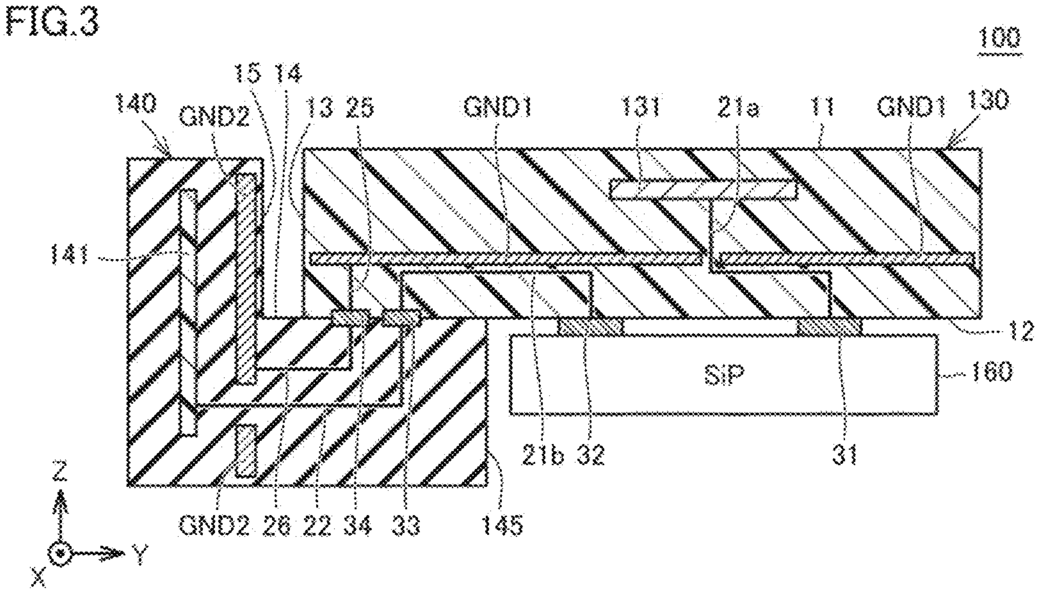
FIG. 3 is a side transparent view of the antenna module according to exemplary embodiment 1.

Next, referring to FIG. 3, details of the structure of the antenna module 100 according to exemplary embodiment 1 will be described. FIG. 3 is a side transparent view of the antenna module 100 according to exemplary embodiment 1.

The antenna module 100 includes the dielectric substrate 130, the antenna disposition member 140, and the SiP 160. The dielectric substrate 130 includes the radiating element 131, and the antenna disposition member 140 includes the radiating element 141. The radiating element 131 is an example of the first radiating element, and the radiating element 141 is an example of the second radiating element.

The dielectric substrate 130 is, for example, a low-temperature co-fired ceramic (LTCC) multilayer substrate. The dielectric substrate 130 may be formed of a multilayer resin substrate including a plurality of laminated resin layers made of a resin, such as epoxy or polyimide.

The dielectric substrate 130 may also be formed of a multilayer resin substrate including a plurality of laminated resin layers made of a liquid crystal polymer (LCP) having a lower dielectric constant. The dielectric substrate 130 may also be formed of a multilayer resin substrate including a plurality of laminated resin layers made of fluororesin, a multilayer resin substrate including a plurality of laminated resin layers made of a polyethylene terephthalate (PET) material, or a multilayer ceramic substrate made of a non-LTCC material.

The dielectric substrate 130 need not necessarily have a multilayer structure and may be a single-layer substrate. A structure corresponding to the dielectric substrate 130 may be formed by a 3D printer. Of course, the structure corresponding to the dielectric substrate 130 may be formed by methods other than by a 3D printer as one of ordinary skill would recognize.

In plan view in the normal direction (the Z-axis direction), the dielectric substrate 130 has a substantially rectangular shape. The radiating element 131 is disposed in the dielectric substrate 130 so as to face the first main surface 11. The radiating element 131 may be exposed to a surface of the dielectric substrate 130.

The SiP 160 is joined to the second main surface of the dielectric substrate 130 via many solder bumps including solder bumps 31 and 32. FIG. 3 illustrates the solder bumps 31 and 32, which are some of many solder bumps.

The antenna disposition member 140 is formed in a substantially L-shape in plan view in the X-axis direction. The radiating element 141 is disposed in the antenna disposition member 140 so as to face the intersecting surface 15. The radiating element 141 may be disposed so as to be exposed to the surface of the antenna disposition member 140.

The second main surface 12 of the dielectric substrate 130 is disposed on the disposition surface 14 of the antenna disposition member 140. The dielectric substrate 130 is joined to the antenna disposition member 140 by many bumps including solder bumps 33 and 34. FIG. 3 illustrates the solder bumps 33 and 34, which are some of many solder bumps.

The intersecting surface 15 of the antenna disposition member 140 faces the side surface 13 of the dielectric substrate 130. A gap that forms an air layer is present between the intersecting surface 15 of the antenna disposition member 140 and a side surface 3 of the dielectric substrate 130.

The radiating element 131 in the dielectric substrate 130 and the radiating element 141 in the antenna disposition member 140 are disposed such that the normal directions of these radiating elements differ from each other. Accordingly, the radiation direction of a radio wave from the radiating element 131 and the radiation direction of a radio wave from the radiating element 141 differ from each other. Specifically, the radiating element 131 radiates a radio wave substantially in the Z-axis direction, and the radiating element 141 radiates a radio wave substantially in the Y-axis direction.

In plan view in a direction normal to the radiating element 141, at least a portion of the radiating element 141 is disposed at a position that overlaps the intersecting surface 15.

Since the dielectric substrate 130 is disposed on the disposition surface 14 of the antenna disposition member 140 with the second main surface 12 therebetween, the dielectric substrate 130 and the antenna disposition member 140 can be stably joined to each other with high strength. It should be noted that the dielectric substrate 130 may be combined with the antenna disposition member 140 such that the side surface 13 of the dielectric substrate 130 is in contact with the antenna disposition member 140. In this case, the side surface 13 of the dielectric substrate 130 may be joined to the antenna disposition member 140.

The radiating element 131 is connected to feed circuits, such as the RFIC 110 and the PMIC 150 in the SiP 160, by a feed wiring line **21*a* that extends from the solder bump 31**.

The radiating element 141 is connected to a feed wiring line 22. The feed wiring line 22 is connected to a feed wiring line **21*b* leading to the SiP 160 via the solder bump 33. The feed wiring line 21***b* is connected to feed circuits, such as the RFIC 110 and the PMIC 150 in the SiP 160, through the solder bump 32. Accordingly, the feed wiring lines that electrically connect the radiating element 141 and the feed circuits (such as the RFIC 110 and the PMIC 150) include a wiring line that spans the dielectric substrate 130 and the antenna disposition member 140 at the solder bump 33, which is a joint portion between the second main surface 12 and the disposition surface 14. The solder bump 33 serves as a joint member that joins the dielectric substrate 130 and the antenna disposition member 140 to each other and also as a connection member that electrically connects the feed wiring lines 21*b* and 22 to each other.

A wiring line 25 connected to a ground electrode GND1 and a wiring line 26 connected to a ground electrode GND2 are electrically connected to each other by the solder bump 34 disposed between the second main surface 12 and the disposition surface 14. The solder bump 34 serves as a joint member that joins the dielectric substrate 130 and the antenna disposition member 140 to each other and also as a connection member that electrically connects the wiring lines 25 and 26 to each other.

The antenna module 100 disclosed in FIG. 3 is applicable to thin mobile information terminals, such as smartphones, that radiate radio waves in different directions. Generally, in such a mobile information terminal, a radiating element is disposed at a position that faces a display, and a radiating element is disposed at a position that faces a side surface to enable radiation of radio waves in different directions. When the antenna module 100 is applied to such a mobile information terminal, the first main surface 11 of the dielectric substrate 130 is disposed to face a surface on which the display is disposed, and the antenna disposition member 140 is disposed to face a side surface corresponding to a thickness direction.

In FIG. 3, the upper surface of the antenna disposition member 140 is lower than the first main surface 11 of the dielectric substrate 130 in the Z-axis direction. However, the antenna disposition member 140 may be configured such that the first main surface 11 of the dielectric substrate 130 is flush with the upper surface of the antenna disposition member 140 in the Z-axis direction.

In the conventional antenna module, a radiating element is disposed on each of substrate surfaces that face the display of the mobile information terminal and face the side surface of the mobile information terminal. Accordingly, in the conventional antenna module, there is a concern that a feed wiring line that passes through a bent portion of the substrate may break. In particular, a risk of wire breakage increases as the bending angle of the substrate approaches 90 degrees to effectively use the volume in the housing of the mobile information terminal.

Accordingly, in the antenna module 100 according to exemplary embodiment 1, without the dielectric substrate 130 being bent, the antenna disposition member 140 in which the radiating element 141 can be disposed along the direction of the side surface 13 is provided at a position that faces the side surface 13 of the dielectric substrate 130. In the antenna module 100 according to exemplary embodiment 1, to prevent the feed wiring line from being bent between the dielectric substrate 130 and the antenna disposition member 140, in a portion of a surface in which the dielectric substrate 130 comes into contact with the antenna disposition member 140 in a relatively wide range, the feed wiring line 21*b* on a side closer to the dielectric substrate 130 and the feed wiring line 22 on a side closer to the antenna disposition member 140 are connected to each other.

As a result, according to exemplary embodiment 1, it is possible to provide the antenna module 100 that can radiate radio waves in two directions while avoiding a risk of breakage of the feed wiring line.

In particular, the antenna module 100 according to exemplary embodiment 1 adopts a structure that considers reduction in the thickness of the mobile information terminal. When the antenna module 100 is applied to the mobile information terminal, the antenna disposition member 140 is disposed to face a side surface of the mobile information terminal. Accordingly, the dimension of the antenna disposition member 140 in the Z-axis direction need be reduced as the thickness of the mobile information terminal is reduced.

Accordingly, in the antenna module 100, the radiating element 141 in the antenna disposition member 140 is disposed at a position that faces the side surface 13 of the dielectric substrate 130. Here, it is assumed that the position of the radiating element 141 is further lowered in the Z-axis direction such that an upper portion of the radiating element 141 in the Z-axis direction is located below the second main surface 12 of the dielectric substrate 130. In this case, since the radiating element 141 is located below the second main surface 12 of the dielectric substrate 130, the radiating element 141 does not face the side surface 13 of the dielectric substrate 130. The dimension of the antenna disposition member 140 in the Z-axis direction need be increased to accommodate, in the antenna disposition member 140, the radiating element 141 disposed as described above. This means an increase in the thickness of the side surface of the antenna module.

However, as illustrated in FIG. 3, since the radiating element 141 is disposed at a position that faces the side surface 13 of the dielectric substrate 130 in the antenna module 100 according to exemplary embodiment 1, the dimension of the antenna disposition member 140 in the Z-axis direction can be reduced. As a result, the antenna module 100 according to exemplary embodiment 1 can correspond to reduction in the thickness of the mobile information terminal.

The antenna disposition member 140 including the entire circuit of the antenna disposition member 140 including the radiating element 141, the feed wiring line 22, and the wiring line 26 is formed by a 3D printer. Accordingly, the antenna disposition member 140 including the circuit of the antenna disposition member 140 can be designed with a relatively high degree of freedom.

In the conventional technology that arranges radiating elements by bending a flexible substrate, since the length of a wiring line becomes long depending on the bent portion, a wiring loss may increase. However, in exemplary embodiment 1, since the antenna disposition member 140 including wiring lines is formed by a 3D printer, wiring patterns in the antenna disposition member 140 can be further optimized.

Embodiment 2

Figure 4:
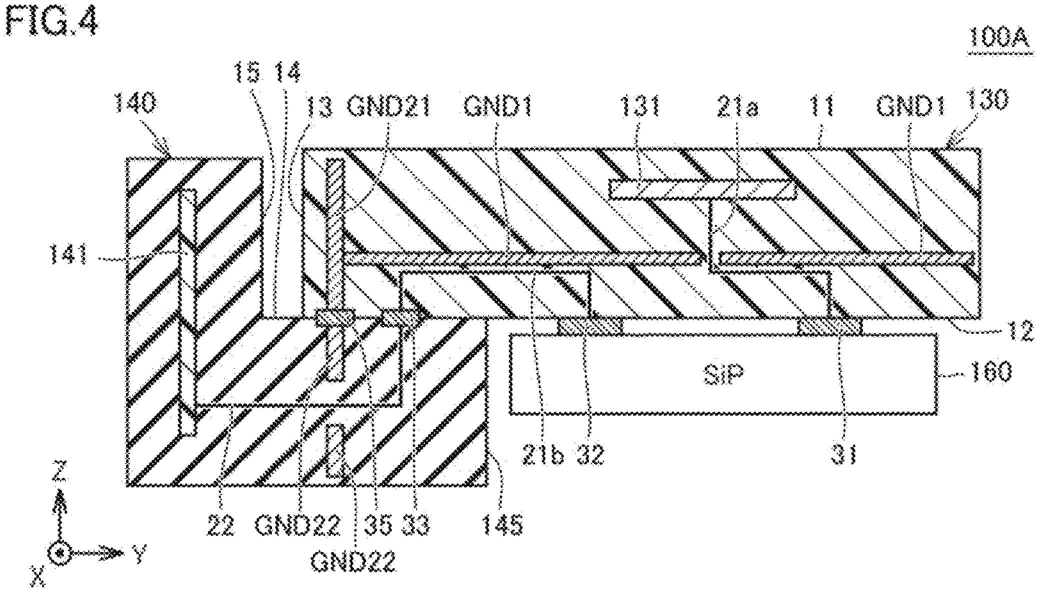
FIG. 4 is a side transparent view of an antenna module according to exemplary embodiment 2.

FIG. 4 is a side transparent view of an antenna module 100A according to exemplary embodiment 2. In the antenna module 100A according to exemplary embodiment 2, ground electrodes GND21 and GND22 are disposed to span the dielectric substrate 130 and the antenna disposition member 140.

As illustrated in FIG. 4, the ground electrode GND21 on the side closer to the dielectric substrate 130 and the ground electrode GND22 on the side closer to the antenna disposition member 140 are electrically connected to each other by a solder bump 35. The solder bump 35 serves as a joint member that joins the dielectric substrate 130 and the antenna disposition member 140 to each other and also as a connection member that electrically connects the ground electrode GND21 on the side closer to the dielectric substrate 130 and the ground electrode GND22 on the side closer to the antenna disposition member 140 to each other.

In the antenna module 100A according to exemplary embodiment 2, the distance between the radiating element 141 and the ground electrodes GND21 and GND22 can be further increased than the distance in the antenna module 100 according to exemplary embodiment 1. Accordingly, the band width of the radiating element 141 of the antenna module 100A according to exemplary embodiment 2 can be further improved than the band width in the antenna module 100 according to exemplary embodiment 1.

Figure 5:
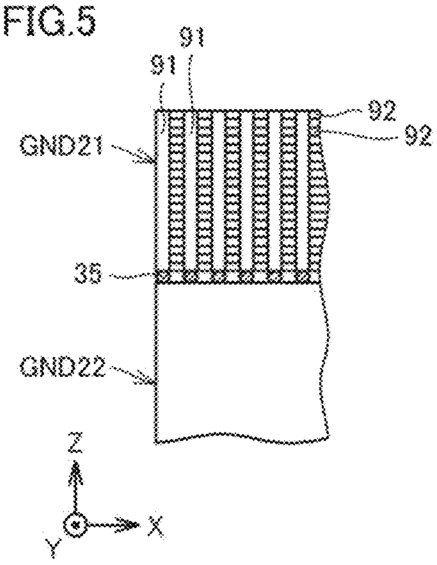
FIG. 5 is a cutaway view illustrating a portion of a ground electrode formed in a mesh pattern and a portion of a ground electrode formed in a solid pattern.

Here, the structures of the ground electrodes GND21 and GND22 will be described with reference to FIG. 5. FIG. 5 is a cutaway view illustrating a portion of the ground electrode GND22 formed in a mesh pattern and a portion of the ground electrode GND22 formed in a solid pattern. As illustrated in FIG. 5, the ground electrode GND21 on the side closer to the dielectric substrate 130 is formed by arranging, in a lattice pattern, vias 91 that encloses a conductive member and flat electrodes 92. Accordingly, the ground electrode GND21 is formed in a mesh pattern. On the other hand, the ground electrode GND22 on a side closer to an antenna disposition member 140*a* is a solid (flat-plate shaped) conductive electrode formed by a 3D printer. The ground electrode GND21 and the ground electrode GND22 are electrically connected to each other via the solder bump 35. The flat electrode 92 is one example of a conductive member that connects adjacent vias 91 of the plurality of vias 91 to each other. The ground electrode GND21 is an example of the first electrode, and ground electrode GND22 is an example of the second electrode.

Embodiment 3

Figure 6:
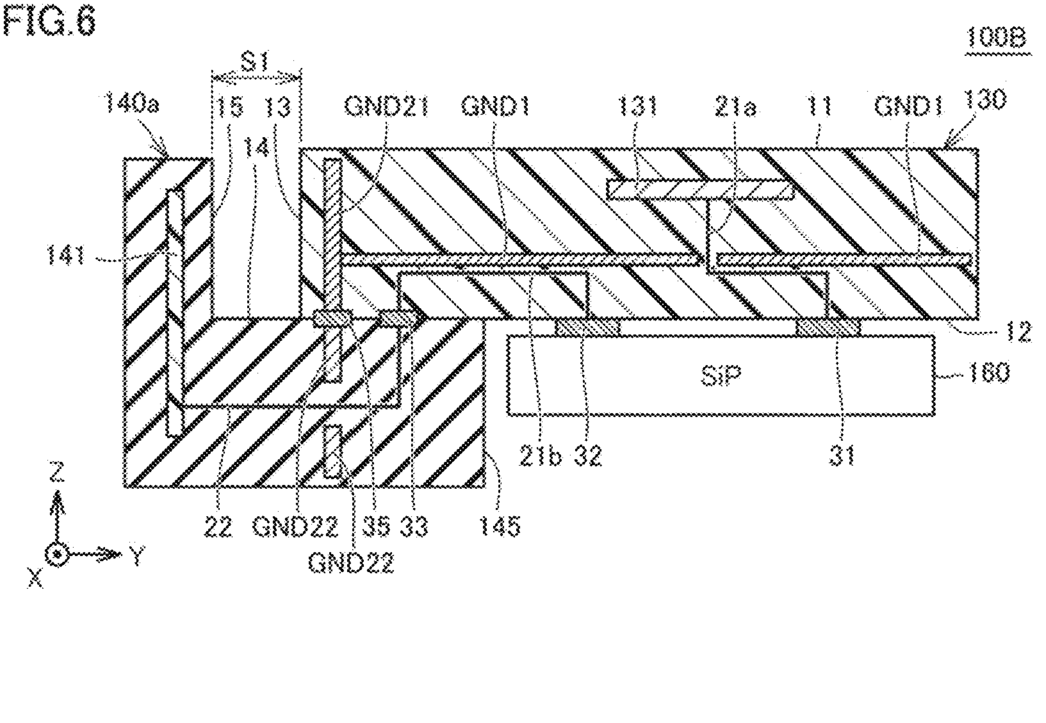
FIG. 6 is a side transparent view of an antenna module according to exemplary embodiment 3.

FIG. 6 is a side transparent view of an antenna module 100B according to exemplary embodiment 3. In an antenna module 100B according to exemplary embodiment 3, the antenna disposition member 140*a* is adopted instead of the antenna disposition member 140. The antenna disposition member 140*a* is formed such that the length of the disposition surface 14 in the Y-axis direction is greater than that of the antenna disposition member 140. In other words, the antenna disposition member 140*a* is formed such that the length in the Y-axis direction of a portion of the antenna disposition member 140*a* that faces the side surface 13 of the dielectric substrate 130 is smaller than that of the antenna disposition member 140.

In the antenna module 100B according to exemplary embodiment 3, a distance S1 between the side surface 13 of the dielectric substrate 130 and the antenna disposition member 140*a* is greater than that of the antenna module 100A according to exemplary embodiment 2.

In the antenna module 100B according to exemplary embodiment 3, the effective dielectric constant between the radiating element 141 and the ground electrodes GND21 and GND22 can be smaller than that of the antenna module 100A according to exemplary embodiment 2 by increasing the thickness of the air layer between the radiating element 141 and the ground electrodes GND21 and GND22. Therefore, in the antenna module 100B according to exemplary embodiment 3, the band width of the radiating element 141 can be wider than that of the antenna module 100A according to exemplary embodiment 2.

In the antenna module 100B according to exemplary embodiment 3, the distance S1 between the side surface 13 of the dielectric substrate 130 and the antenna disposition member 140*a* may be the same as that of the antenna module 100A according to exemplary embodiment 2. As a result, the length in the Y-axis direction can be smaller than that of the antenna module 100A according to exemplary embodiment 2.

Embodiment 4

Figure 7:
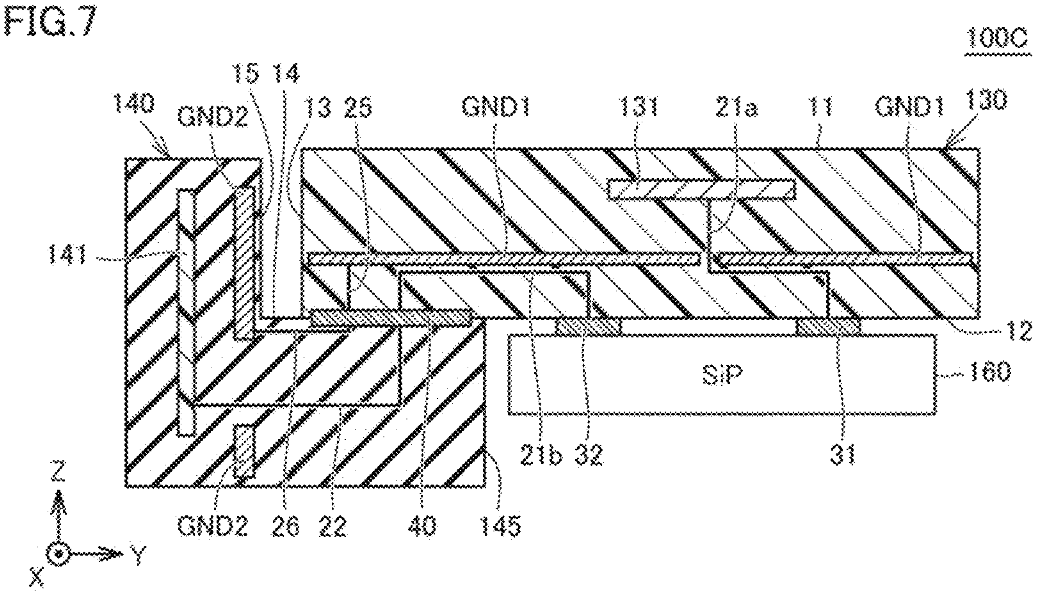
FIG. 7 is a side transparent view of an antenna module according to exemplary embodiment 4.

FIG. 7 is a side transparent view of an antenna module 100C according to exemplary embodiment 4. In the antenna module 100C according to exemplary embodiment 4, the dielectric substrate 130 and the antenna disposition member 140 are joined to each other not by a solder bump but by an anisotropic conductive member 40. The antenna module 100C according to exemplary embodiment 4 differs from the antenna module 100 according to exemplary embodiment 1 in this point.

In the antenna module 100C, the feed wiring line 21*b* and the feed wiring line 22 are electrically connected to each other by the anisotropic conductive member 40. In the antenna module 100C, the wiring line 25 and the wiring line 26 are electrically connected to each other by the anisotropic conductive member 40.

When the dielectric substrate 130 and the antenna disposition member 140 are joined to each other by the anisotropic conductive member 40, these components can be joined via a wide area instead of a point like a solder bump. As a result, in the antenna module 100C according to exemplary embodiment 4, the dielectric substrate 130 and the antenna disposition member 140 can be joined to each other by the anisotropic conductive member 40 with higher strength while conductivity between the dielectric substrate 130 and the antenna disposition member 140 is maintained.

Embodiment 5

Figure 8:
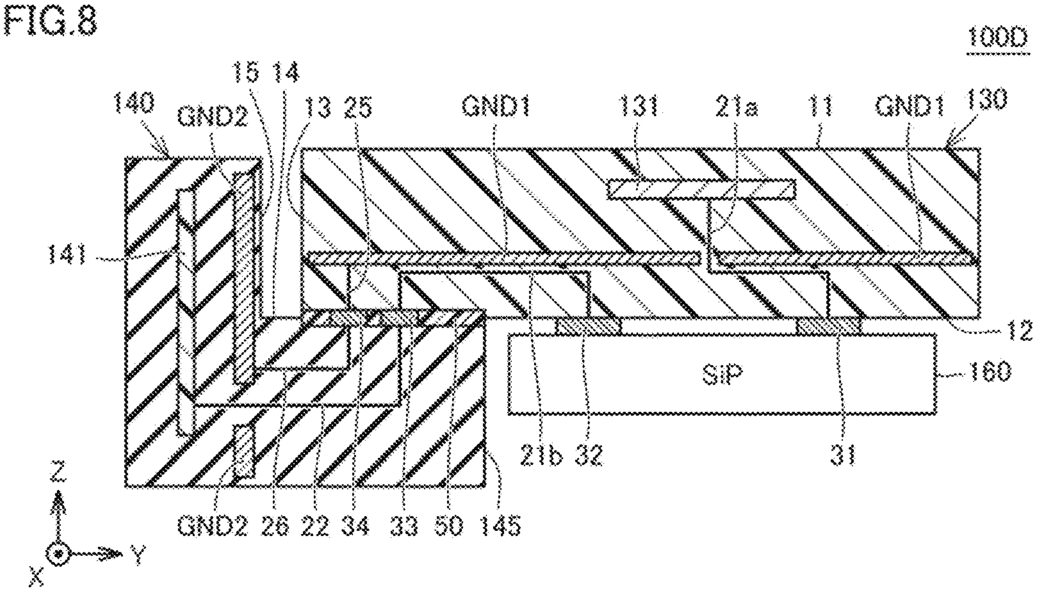
FIG. 8 is a side transparent view of an antenna module according to exemplary embodiment 5.

FIG. 8 is a side transparent view of an antenna module 100D according to exemplary embodiment 5. In the antenna module 100D according to exemplary embodiment 5, the joint surface between the dielectric substrate 130 and the antenna disposition member 140 is filled with an underfill member 50. In exemplary embodiment 5, the dielectric substrate 130 and the antenna disposition member 140 are joined to each other by many solder bumps including the solder bumps 33 and 34, as in the antenna module 100 according to exemplary embodiment 1. After that, the joint surface between the dielectric substrate 130 and the antenna disposition member 140 is filled with the underfill member 50.

In the antenna module 100D according to exemplary embodiment 5, the gap between adjacent solder bumps at the joint surface between the dielectric substrate 130 and the antenna disposition member 140 is filled with the underfill member 50 having high adhesiveness. As a result, in the antenna module 100D according to exemplary embodiment 5, the dielectric substrate 130 and the antenna disposition member 140 can be joined to each other with higher strength. In addition, in exemplary embodiment 5, the surface of the solder bump 33 that electrically connects the feed wiring lines 21*b* and 22 and the surface of the solder bump 34 that electrically connects the wiring lines 25 and 26 are covered with the underfill member 50. In exemplary embodiment 5, this can prevent reduction in the conductivity of the solder bumps 33 and 34 because the solder bumps 33 and 34 are in contact with air.

Embodiment 6

Figure 9:
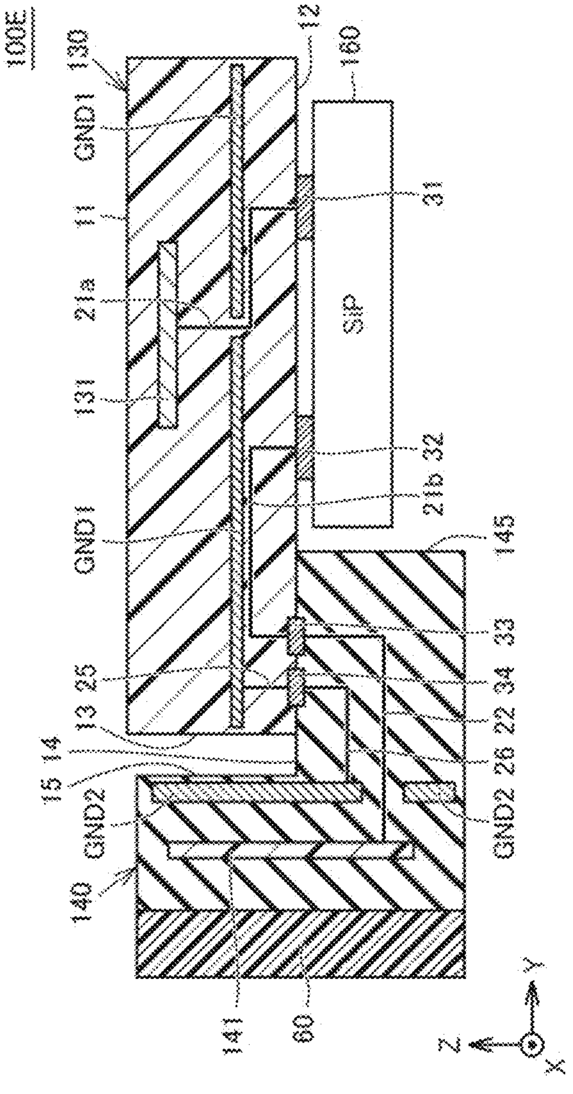
FIG. 9 is a side transparent view of an antenna module according to exemplary embodiment 6.

FIG. 9 is a side transparent view of an antenna module 100E according to exemplary embodiment 6. In the antenna module 100E according to exemplary embodiment 6, a different dielectric 60 with a dielectric constant that differs from that of the antenna disposition member 140 is joined to the surface of the antenna disposition member 140 that corresponds to the radiation direction of the radiating element 141.

In the antenna module 100E according to exemplary embodiment 6, the different dielectric 60 with a dielectric constant that differs from that of the antenna disposition member 140 provided on the radiation surface of the radiating element 141 can increase the spread of the electric field lines of the radiating element 141. As a result, the band width of the radiating element 141 can be improved.

Embodiment 7

Figure 10:
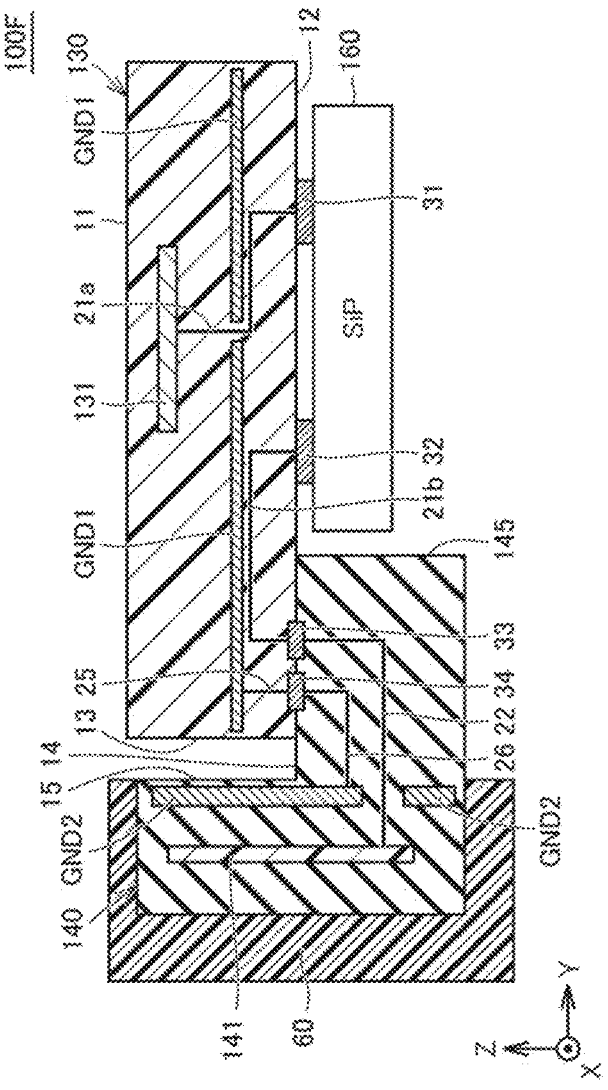
FIG. 10 is a side transparent view of an antenna module according to exemplary embodiment 7.

FIG. 10 is a side transparent view of an antenna module 100F according to exemplary embodiment 7. The antenna module 100F according to exemplary embodiment 7 differs from the antenna module 100E according to exemplary embodiment 6 in the shape of the different dielectric 60. In the antenna module 100F according to exemplary embodiment 7, the different dielectric 60 covers the radiating surface of the radiating element 141 of the antenna disposition member 140 and the upper and lower surfaces of the antenna disposition member 140 that face the both side surfaces of the radiating element 141. However, the different dielectric 60 is not provided between the side surface 13 of the dielectric substrate 130 and the antenna disposition member 140.

In the antenna module 100F according to exemplary embodiment 7, the spread of the electric field lines in the Z-axis direction of the radiating element 141 can be further increased than in the antenna module 100E according to exemplary embodiment 6. As a result, the band width of the radiating element 141 can be further improved.

Embodiment 8

Figure 11:
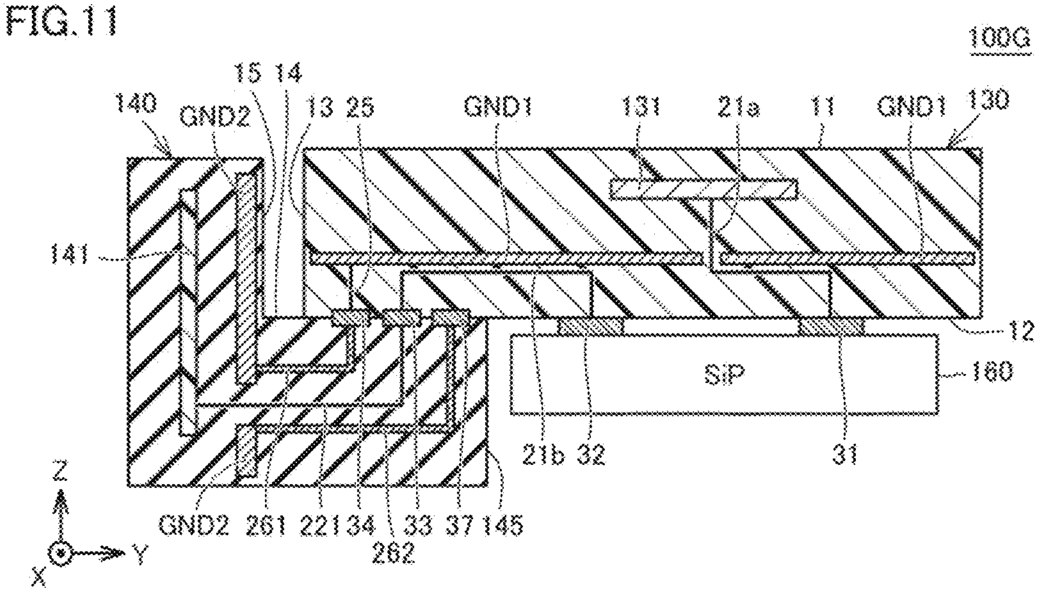
FIG. 11 is a side transparent view of an antenna module according to exemplary embodiment 8.

FIG. 11 is a side transparent view of an antenna module 100G according to exemplary embodiment 8. In the antenna module 100G according to exemplary embodiment 8, the feed wiring lines in the antenna disposition member 140 are configured by coaxial wiring lines 221, 261, and 262 including the wiring line leading to the ground electrode GND2. The coaxial wiring lines 221, 261, and 262 are connected to the dielectric substrate 130 by the solder bumps 33, 34, and 37. The antenna module 100G according to exemplary embodiment 8 differs from the antenna module 100 according to exemplary embodiment 1 in that the coaxial wiring lines 221, 261, and 262 described above are used. The coaxial wiring lines 221, 261, and 262 are formed by a 3D printer along with other components of the antenna disposition member 140. Of course, these components may also be formed by other methods other than using a 3D printer as one of ordinary skill would recognize.

In the antenna module 100G according to exemplary embodiment 8, a loss of power fed to the radiating element 141 can be smaller than in the antenna module 100 according to exemplary embodiment 1.

Embodiment 9

Figure 12:
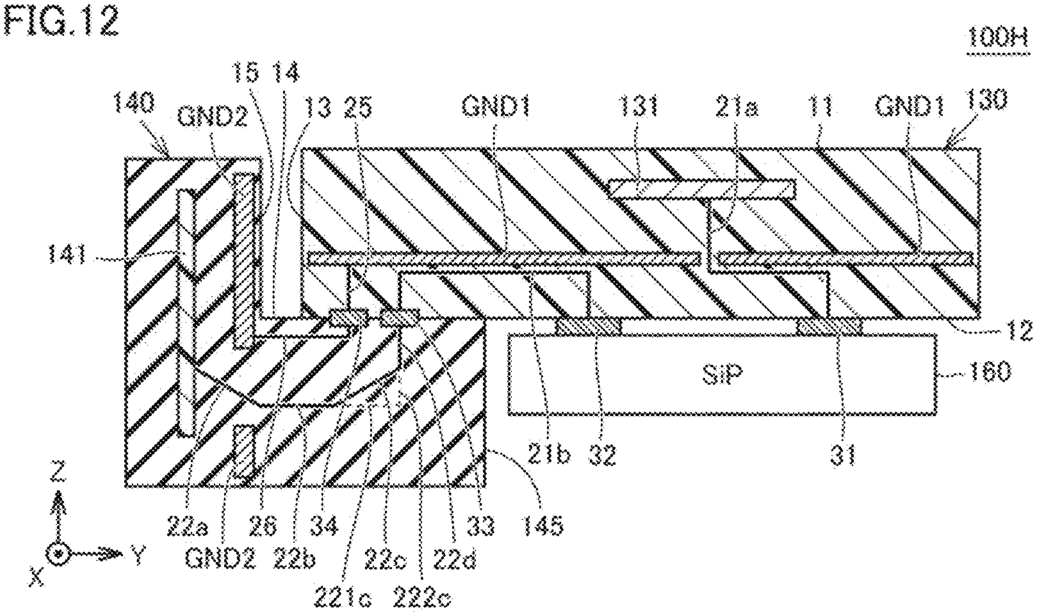
FIG. 12 is a side transparent view of an antenna module according to exemplary embodiment 9.

FIG. 12 is a side transparent view of an antenna module 100H according to exemplary embodiment 9. In the antenna module 100H according to exemplary embodiment 9, the feed wiring lines in the antenna disposition member 140 are configured by feed wiring lines 22*a* to 22*d* including wiring lines disposed diagonally. The feed wiring lines 22*a* to 22*d* includes, for example, the feed wiring line 22*b* and the feed wiring line 22*c* connected diagonally to the feed wiring line 22*b*. The antenna module 100H according to exemplary embodiment 9 differs from the antenna module 100 according to exemplary embodiment 1 in this point.

When the feed wiring line 22*b* and the feed wiring line 22*d* are connected to each other, as illustrated by a broken line in FIG. 12, use of a feed wiring line 221*c* extending along the straight line passing through the feed wiring line 22*b* and a feed wiring line 222*c* connected orthogonally to the feed wiring line 221*c* is considered.

However, when the feed wiring line 22*b* and the feed wiring line 22*d* are connected to each other, the feed wiring line 22*c* can be used to reduce the length of connection rather than use of the feed wiring lines 221*c* and 222*c*. As described above, in exemplary embodiment 9, the length of the feed wiring line can be reduced by use of the feed wiring lines extending diagonally. As a result, the antenna module 100H according to exemplary embodiment 9 can further reduce a loss of power fed to the radiating element 141 than the antenna module 100 according to exemplary embodiment 1.

It should be noted that the feed wiring line from the solder bump 33 to the radiating element 141 in FIG. 12 may be a straight line.

The feed wiring lines 22*a* to 22*d* including other components of the antenna disposition member 140 are formed by a 3D printer, but other methods may be used without departing from the scope of the present disclosure. Accordingly, the wiring directions of the feed wiring lines 22*a* to 22*d* including can be flexibly determined to, for example, diagonal directions.

Embodiment 10

Figure 13:
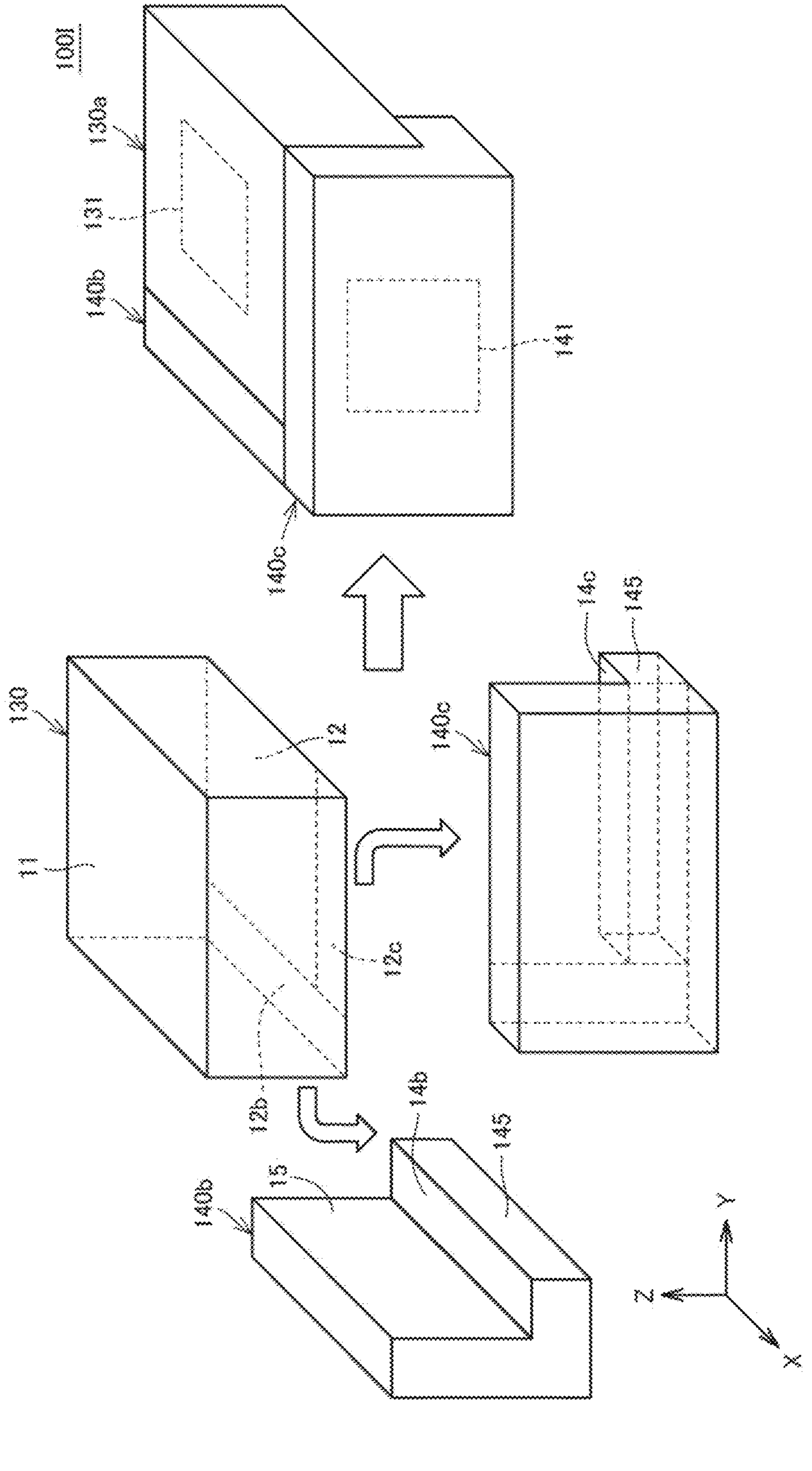
FIG. 13 is a perspective view of an antenna module according to exemplary embodiment 10.

FIG. 13 is a perspective view of an antenna module 100I according to exemplary embodiment 10. The antenna module 100I according to exemplary embodiment 10 is formed by two antenna disposition members 140*b* and 140*c* being joined to the dielectric substrate 130.

The antenna disposition members 140*b* and 140*c* according to exemplary embodiment 10 have the same structure as the antenna disposition member 140 according to exemplary embodiment 1 with the exception of the outer shape.

As illustrated in FIG. 13, an opposite surface 12*b* that is a portion of the second main surface 12 of the dielectric substrate 130 is joined to a disposition surface 14*b* of the antenna disposition member 140*b*. An opposite surface 12*c* that is a portion of the second main surface 12 of the dielectric substrate 130 is joined to a disposition surface 14*c* of the antenna disposition member 140*c*. As a result, the antenna module 100I is formed. The antenna module 100I according to exemplary embodiment 10 can radiate radio waves from three surfaces. It should be noted that a third antenna disposition member and a fourth antenna disposition member may be provided on the dielectric substrate 130 so as to surround the first main surface 11 and the second main surface 12 of the dielectric substrate 130.

Embodiment 11

Figure 14:
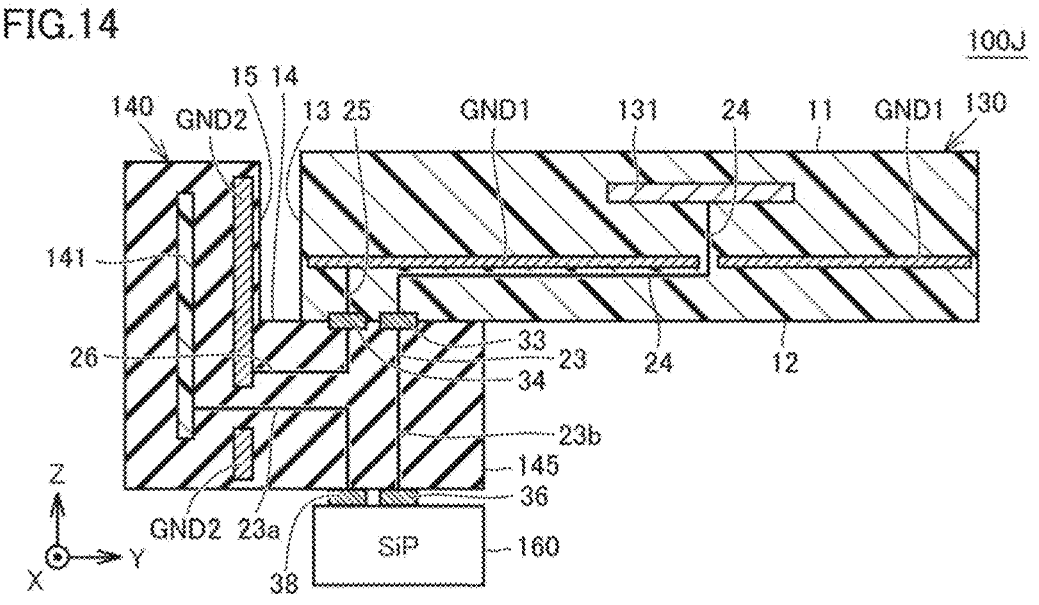
FIG. 14 is a side transparent view of an antenna module according to exemplary embodiment 11.

FIG. 14 is a side transparent view of an antenna module 100J according to exemplary embodiment 11. In the antenna module 100J according to exemplary embodiment 11, the SiP 160 is attached to the antenna disposition member 140 instead of the dielectric substrate 130. The antenna module 100J according to exemplary embodiment 11 differs from the antenna module 100 according to exemplary embodiment 1 in this point.

In exemplary embodiment 11, the radiating element 141 is connected to the feed circuits, such as the RFIC 110 and the PMIC 150 in the SiP 160, by a feed wiring line 23*a* extending from a solder bump 38.

The radiating element 131 is connected to the feed wiring line 24. The feed wiring line 24 is connected to a feed wiring line 23*b* leading to the SiP 160 via the solder bump 33. The feed wiring line 23*b* is connected to the feed circuits, such as the RFIC 110 and the PMIC 150 in the SiP 160, by the solder bumps 36. Accordingly, the feed wiring lines that electrically connect the radiating element 131 and the feed circuits (such as the RFIC 110 and the PMIC 150) includes a wiring line that spans the dielectric substrate 130 and the antenna disposition member 140 at the solder bump 33, which is a joint portion between the second main surface 12 and the disposition surface 14.

In the antenna module 100J according to exemplary embodiment 11, a space can be effectively utilized by a component other than the SiP 160 being disposed below the second main surface 12 of the dielectric substrate 130.

Embodiment 12

Figure 15:
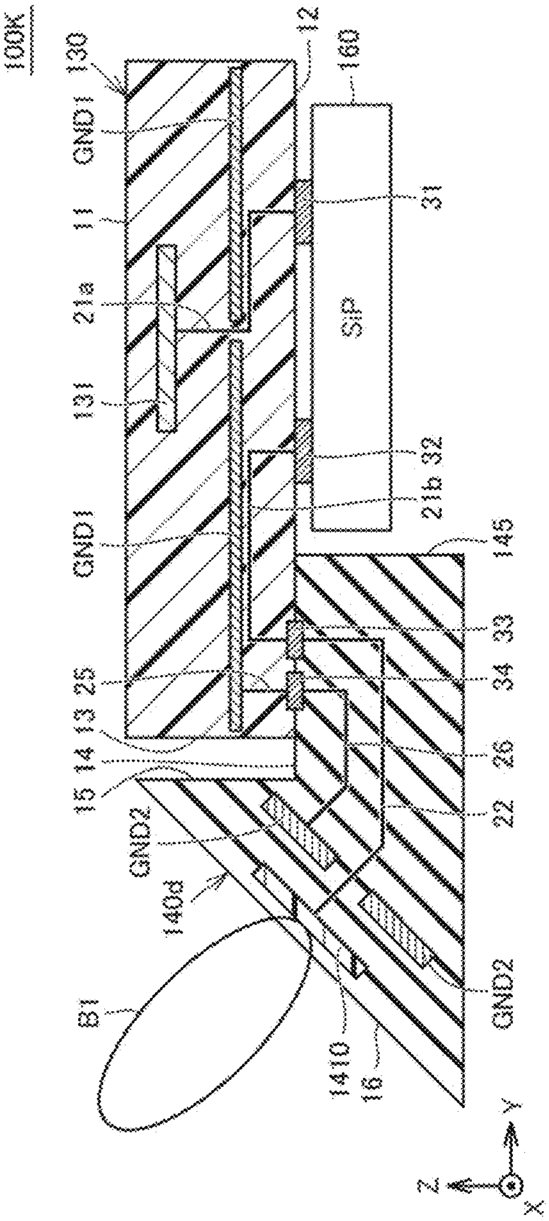
FIG. 15 is a side transparent view of an antenna module according to exemplary embodiment 12.

FIG. 15 is a side transparent view of an antenna module 100K according to exemplary embodiment 12. In the antenna module 100K according to exemplary embodiment 12, an antenna disposition member 140*d* is adopted instead of the antenna disposition member 140.

The antenna disposition member 140*d* differs from the antenna disposition member 140 in the outer shape and the angle of the radiating element 141 disposed to face the side surface 13 of the dielectric substrate 130. The direction normal to the radiating element 141 disposed in the antenna disposition member 140 is parallel to the Y-axis. The direction normal to the radiating element 141 disposed in the antenna disposition member 140*d* intersects the Y-axis. The antenna disposition member 140*d* has a surface 16 orthogonal to the direction normal to the radiating element 141.

The antenna module 100K according to exemplary embodiment 12 can radiate a radio wave diagonally upward (in a beam direction B1) of the first main surface 11 of the dielectric substrate 130 from the radiating element 141 of the antenna disposition member 140*d*.

Embodiment 13

Figure 16:
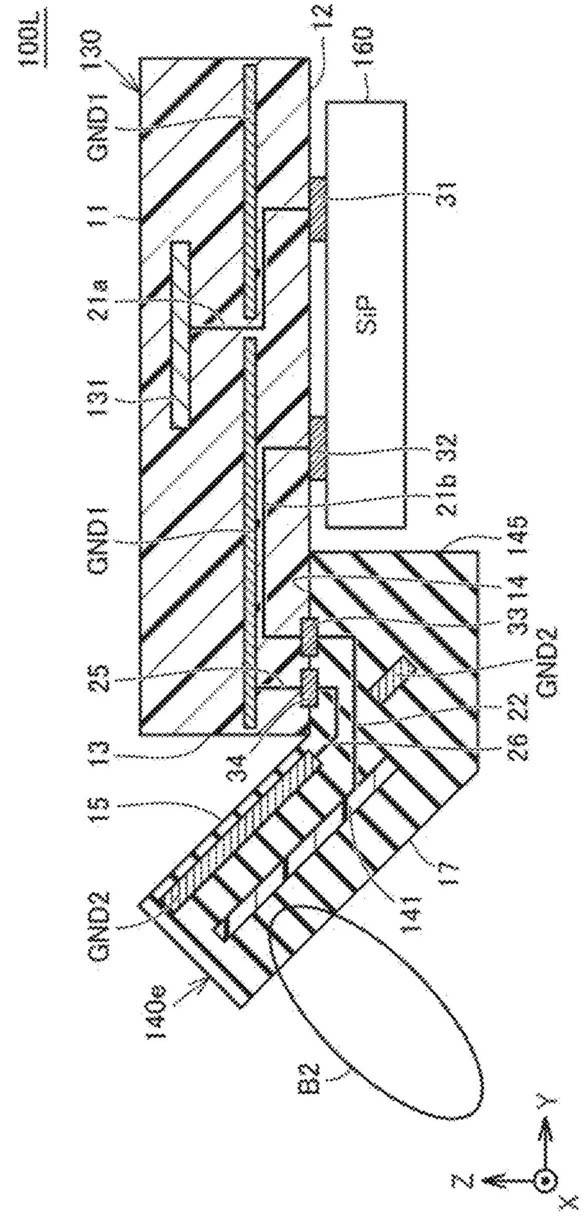
FIG. 16 is a side transparent view of an antenna module according to exemplary embodiment 13.

FIG. 16 is a side transparent view of an antenna module 100L according to exemplary embodiment 13. In the antenna module 100L according to exemplary embodiment 13, an antenna disposition member 140*e* is adopted instead of the antenna disposition member 140*d* of the antenna module 100K according to exemplary embodiment 12.

The position of the radiating element 141 in the antenna disposition member 140*e* is obtained by the radiating element 141 in the antenna disposition member 140*d* being rotated approximately 90 degrees counterclockwise about the X-axis. The antenna disposition member 140*e* has a surface 17 orthogonal to the direction normal to the radiating element 141. The angle formed by the disposition surface 14 of the antenna disposition member 140*e* and the intersecting surface 15 is an obtuse angle greater than 90 degrees.

The antenna module 100L according to exemplary embodiment 13 can radiate a radio wave diagonally downward (in a beam direction B2) of the second main surface 12 of the dielectric substrate 130 from the radiating element 141 of the antenna disposition member 140*e*.

Embodiment 14

Figure 17:
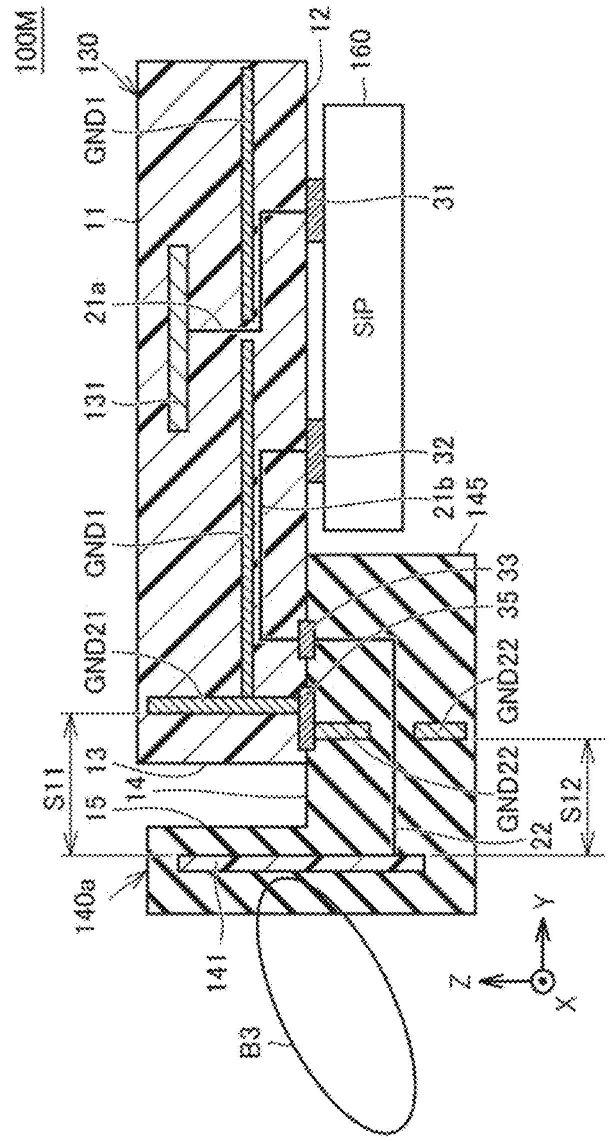
FIG. 17 is a side transparent view of an antenna module according to exemplary embodiment 14.

FIG. 17 is a side transparent view of an antenna module 100M according to exemplary embodiment 14. In the antenna module 100M according to exemplary embodiment 14, a portion of the structure of the antenna module 100B according to exemplary embodiment 3 is changed.

In the antenna module 100B according to exemplary embodiment 3, in plan view of the dielectric substrate 130 in the X-axis direction, the ground electrode GND21 on the side closer to the dielectric substrate 130 and the ground electrode GND22 on the side closer to the antenna disposition member 140 are disposed on a straight line along the Z-axis. In the antenna module 100M according to exemplary embodiment 14, in plan view of the dielectric substrate 130 in the X-axis direction, the ground electrode GND21 on the side closer to the dielectric substrate 130 and the ground electrode GND22 on the side closer to the antenna disposition member 140 are not disposed on the same straight line along the Z-axis but deviate from each other in the Y-axis direction.

That is, in exemplary embodiment 14, the ground electrode GND21 and the ground electrode GND22 are connected to the solder bump 35 at positions at which a distances S11 between the radiating element 141 and the ground electrode GND21 differs from a distance S12 between the radiating element 141 and the ground electrode GND22.

In particular, in exemplary embodiment 14, the distance S11 between the radiating element 141 and the ground electrode GND22 is greater than the distance S12 between the radiating element 141 and the ground electrode GND21.

In exemplary embodiment 14, the asymmetry of the distance between the radiating element 141 and the ground electrode GND21 enables a radio wave to be radiated in a beam direction B3 from the radiating element 141. As described above, since the direction of a radio wave radiated from the radiating element 141 can be inclined toward the mounting surface of the SiP 160 in exemplary embodiment 14, the coverage of the entire antenna module 100M can be extended.

Embodiment 15

Figure 18:
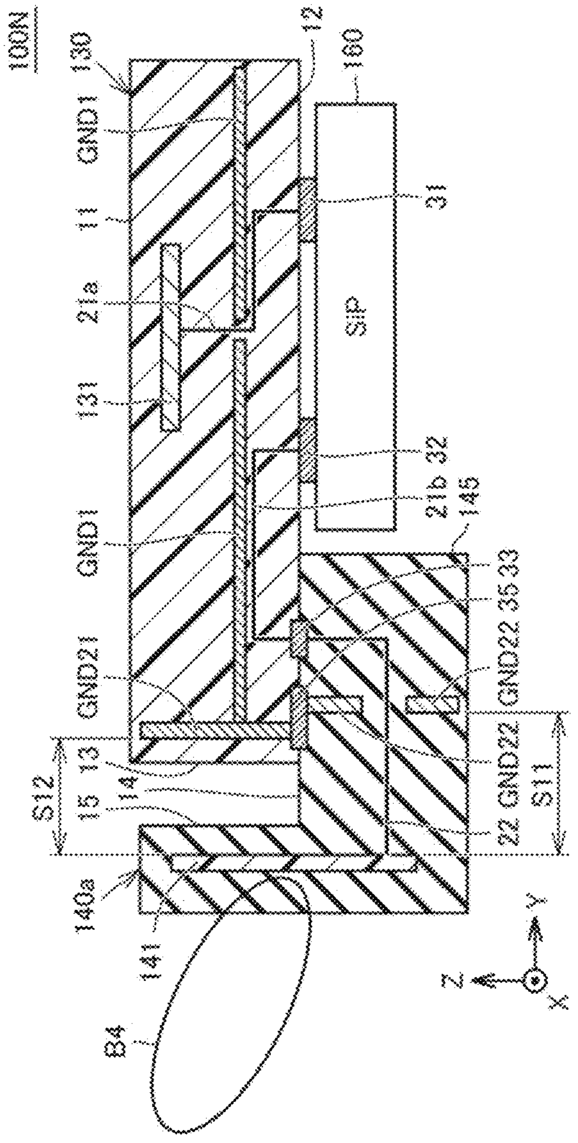
FIG. 18 is a side transparent view of an antenna module according to exemplary embodiment 15.

FIG. 18 is a side transparent view of an antenna module 100N according to exemplary embodiment 15. In the antenna module 100N according to exemplary embodiment 15, the relationship between the distance between the radiating element 141 and the ground electrode GND21 and the distance between the radiating element 141 and the ground electrode GND22 is opposite to that of the antenna module 100M according to exemplary embodiment 14. That is, in the antenna module 100N according to exemplary embodiment 15, the distance S12 between the radiating element 141 and the ground electrode GND21 is greater than the distance S11 between the radiating element 141 and the ground electrode GND22.

In exemplary embodiment 15, the asymmetry of the distance between the radiating element 141 and the ground electrode GND21 enables a radio wave to be radiated in a beam direction B4 from the radiating element 141. As described above, in exemplary embodiment 14, the direction of a radio wave radiated from the radiating element 141 can be inclined toward the first main surface 11, which is opposite to the mounting surface of the SiP 160. As a result, in exemplary embodiment 14, precise beam steering in the direction of the first main surface 11 (upper direction) can be performed in conjunction with the radiating element 131 mounted on the side closer to the dielectric substrate 130.

Embodiment 16

Figure 19A:
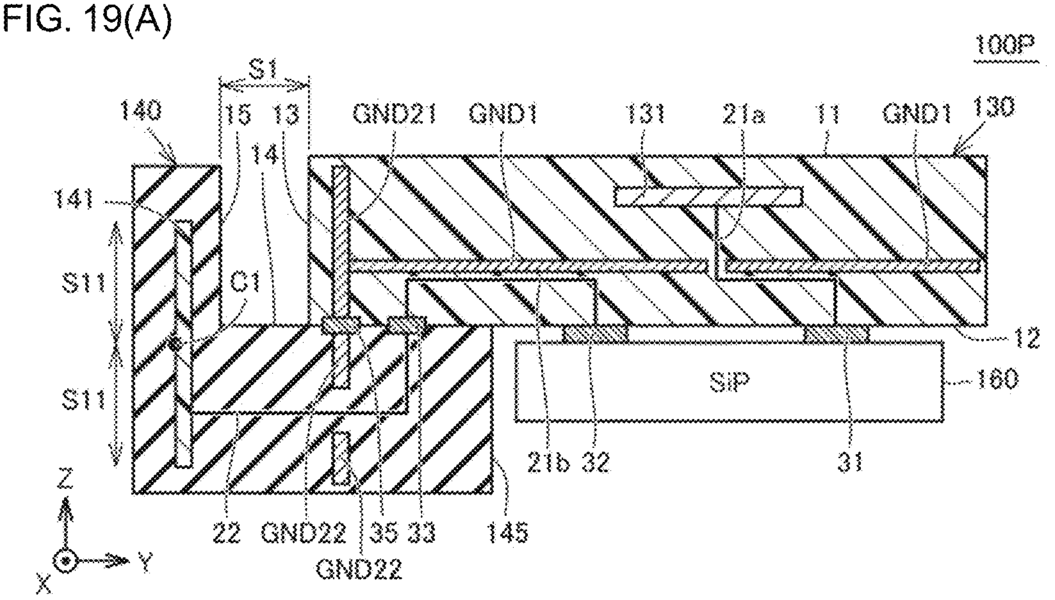
FIG. 19(A) is a side transparent view of an antenna module according to exemplary embodiment 16.
Figure 19B:
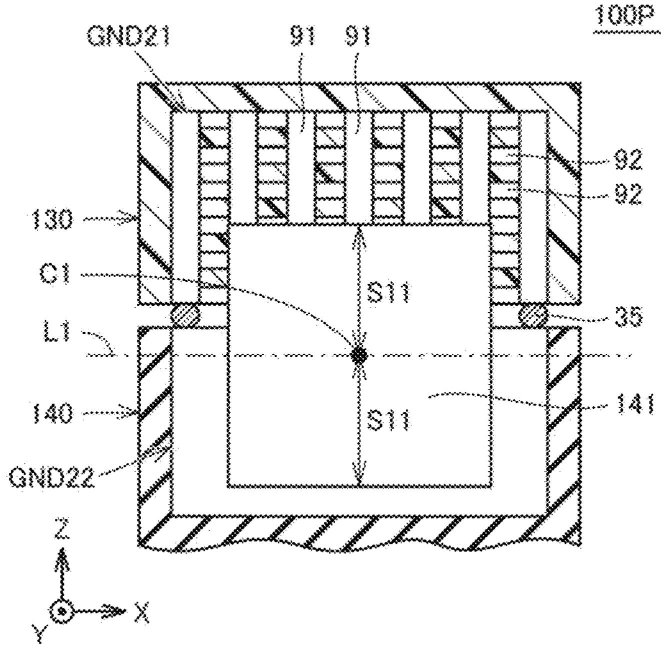
FIG. 19(B) is a transparent plan view of an antenna module according to exemplary embodiment 16.

FIG. 19 is a side transparent view of an antenna module 100P according to exemplary embodiment 16. FIG. 19(A) is a side transparent view illustrating the antenna module 100P in plan view in the positive direction of the X-axis, and FIG. 19(B) is a side transparent view illustrating the antenna module 100P in plan view in the positive direction of the Y-axis.

In the antenna module 100P according to exemplary embodiment 16, a portion of the structure of the antenna module 100B according to exemplary embodiment 3 has been changed. Specifically, the radiating element 141 of the antenna module 100P according to exemplary embodiment 16 faces the side surface 13 of the dielectric substrate 130 on the side closer to the lower surface of the antenna disposition member 140 than does the radiating element 141 of the antenna module 100B according to exemplary embodiment 3.

As a result, as illustrated in FIG. 19(B), in the antenna module 100P, a center line L1 that passes through a center point C1 of the radiating element 141 and is parallel to the X-axis faces the ground electrode GND22 of the ground electrode GND21 disposed on the side closer to the dielectric substrate 130 and the ground electrode GND22. In other words, in exemplary embodiment 16, the center of the radiating element 141 is located closer to a ground electrode GND22 than is the disposition surface 14 in plan view in the direction normal to the radiating element 141.

The ground electrode GND21 is formed in a mesh pattern by combining many vias 91 and many flat electrodes 92. On the other hand, the ground electrode GND22 is formed of a solid flat plate. Accordingly, the effective conductivity of the ground electrode GND21 is lower than the effective conductivity of the ground electrode GND22. Accordingly, by eccentrically positioning the center of the radiating element 141 toward the ground electrode GND22, the ratio of a portion of the ground electrode GND22 having a high conductivity used as the ground electrode of the radiating element 141 can be increased. As a result, the radiation efficiency in exemplary embodiment 16 can be further increased than in exemplary embodiment 3.

Embodiment 17

Figure 20A:
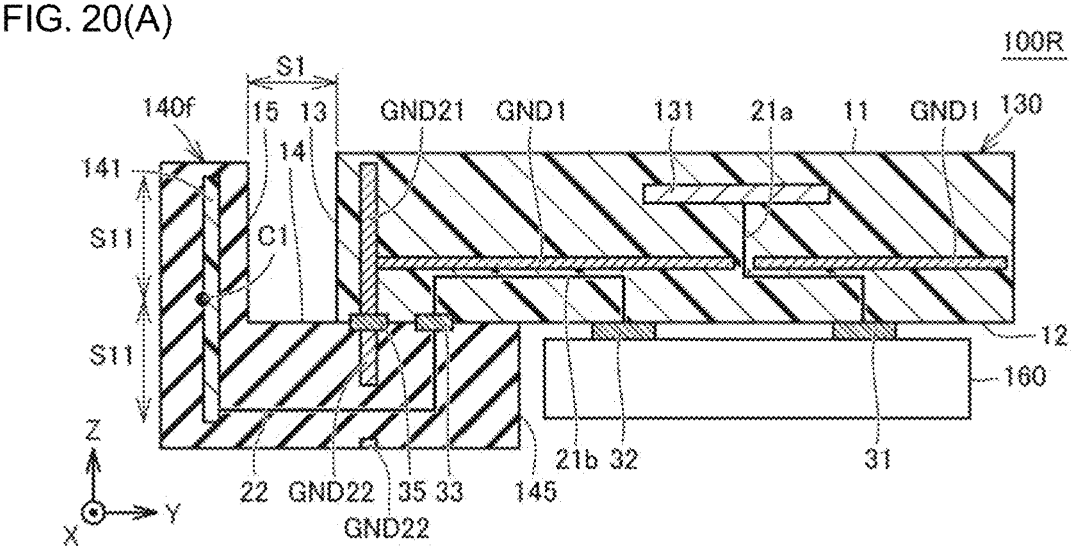
FIG. 20(A) is a side transparent view of an antenna module according to exemplary embodiment 17.
Figure 20B:
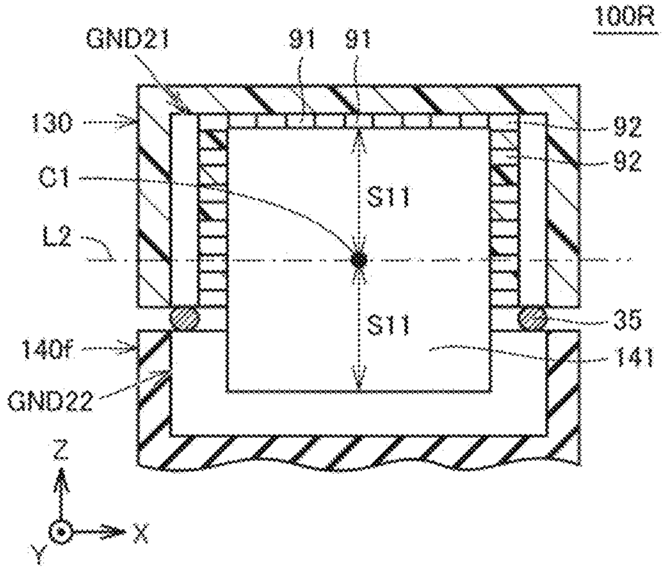
FIG. 20(B) is a transparent plan view of an antenna module according to exemplary embodiment 17.

FIG. 20 is a side transparent view of an antenna module 100R according to exemplary embodiment 17. FIG. 20(A) is a side transparent view illustrating the antenna module 100R in plan view in the positive direction of the X-axis, and FIG. 20(B) is a side transparent view illustrating the antenna module 100R in plan view in the positive direction of the Y-axis.

In the antenna module 100R according to exemplary embodiment 17, the thickness of an antenna disposition member 140*f* is reduced by reversing the disposition between the radiating element 141 and the ground electrodes GND21 and GND22 of the antenna module 100P according to exemplary embodiment 16.

As illustrated in FIG. 20(B), in the antenna module 100R, a center line L2 that passes through the center point C1 of the radiating element 141 and is parallel to the X-axis faces the ground electrode GND21 disposed on the side closer to the dielectric substrate 130 of the ground electrode GND21 and the ground electrode GND22. In other words, in exemplary embodiment 17, the center of the radiating element 141 is located closer to a ground electrode GND21 than is the disposition surface 14 in plan view in the direction normal to the radiating element 141. As a result, the radiating element 141 can be disposed closer to the upper surface of the antenna disposition member 140*f*. As a result, the thickness of the antenna disposition member 140*f* in exemplary embodiment 16 can be smaller than the thickness of the antenna disposition member in exemplary embodiment 17, exemplary embodiment 3, or the like. In exemplary embodiment 16, a low profile of the entire antenna module 100R can be achieved by reduction in the thickness of the antenna disposition member 140*f*. As a result, the radiation efficiency of a radio wave can be improved.

It will be appreciated that the structures in exemplary embodiments 14 to 17 are also applicable to exemplary embodiment 2 in which the distances between the radiating element 141 and the ground electrodes GND21 and 22 are smaller than those in exemplary embodiment 3.

Modification 1

Figure 21:
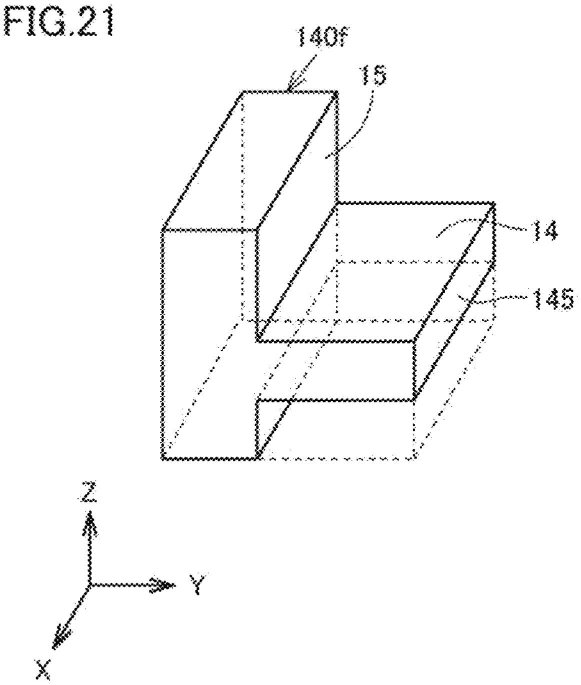
FIG. 21 is a perspective view of an antenna disposition member according to modification 1.

Modification 1 will be described with reference to FIG. 21. FIG. 21 is a perspective view of the antenna disposition member 140*f* according to modification 1. In the antenna disposition member 140*f*, the shape of the projecting portion 145 differs from the shape of the projecting portion 145 of the antenna disposition member 140 and the like described so far. As illustrated in FIG. 21, the projecting portion 145 has a shape in which the bottom of the projecting portion 145 described so far has been cut out. In modification 1, a space below the antenna disposition member 140*f* can be utilized.

In the present disclosure, any two or any three or more of the exemplary embodiments described above may be combined with each other. For example, the structure in exemplary embodiment 2 is applicable to any exemplary embodiments subsequent to exemplary embodiment 3.

The exemplary embodiments disclosed here should be considered as illustrative and not restrictive in any way. The scope of the present disclosure is indicated by the appended claims not by the description of the exemplary embodiments described above and is intended to include all changes within the meaning and the scope equivalent to the appended claims.

REFERENCE SIGNS LIST

10 communication device
11 first main surface
12 second main surface
12*a*, 12*b* opposite surface

13 side surface
14, 14*b*, 14*c* disposition surface
15 intersecting surface
16, 17 surface
21 to 24, 21*a*, 21*b*, 23*a*, 23*b*, 22*a* to 22*d* feed wiring line
25, 26 wiring line
31 to 38 solder bump
40 anisotropic conductive member
50 underfill member
60 different dielectric
91 via
92 flat electrode
100, 100A to 100N, 100P, 100R antenna module
110 RFIC
111A to 111H, 113A to 113H, 117A, 117B switch
112AR to 112HR low-noise amplifier
112AT to 112HT power amplifier
114A to 114H attenuator
115A to 115H phase shifter
116A, 116B signal combining/dividing unit
118A, 118B mixer
119A, 119B amplification circuit
130 dielectric substrate
131, 141, 141A radiating element
140, 140*a* to 140*f* antenna disposition member
145 projecting portion
150 PMIC
160 SiP
200 BBIC
221, 261, 262 coaxial wiring line
B1 to B4 beam direction
C1 center point
GND1, GND2, GND21, GND22 ground electrode
L1, L2 center line
S1, S11, S12, S21, S22 distance
P1, P2 branch point
T11 thickness

The invention claimed is:

1. An antenna module comprising:
a first radiating element;
a second radiating element;
a substrate including a first main surface and a second main surface facing away from the first main surface, the first radiating element being disposed closer to the first main surface than to the second main surface;
a first antenna disposition member in which the second radiating element is disposed; and
a feed circuit that supplies a high-frequency signal to the first radiating element and the second radiating element,
wherein the first antenna disposition member includes a first disposition surface on which the substrate is disposed and a first intersecting surface that intersects the first disposition surface,
the second main surface is joined to the first disposition surface, and
a feed wiring line that electrically connects the first radiating element or the second radiating element to the feed circuit includes a wiring line that spans the substrate and the first antenna disposition member in a first joint portion between the second main surface and the first disposition surface.

2. The antenna module according to claim 1,
wherein the first antenna disposition member is disposed such that the first intersecting surface faces a side surface of the substrate.

3. The antenna module according to claim 2,
wherein the second radiating element is formed of an electrode having a flat-plate shape, and
the second radiating element is disposed at a position at which at least a portion of the second radiating element overlaps the first intersecting surface in plan view in a direction normal to the second radiating element.

4. The antenna module according to claim 3,
wherein a gap is present between the first intersecting surface and the side surface of the substrate that faces the first intersecting surface.

5. The antenna module according to claim 1, further comprising:
a ground electrode disposed to face the second radiating element,
wherein the ground electrode includes a first electrode disposed in the substrate and a second electrode disposed in the first antenna disposition member, and the first electrode is electrically connected to the second electrode.

6. The antenna module according to claim 5, further comprising:
a connection member that electrically connects the first electrode to the second electrode,
wherein the first electrode and the second electrode are connected to the connection member at a position at which a distance between the second radiating element and the first electrode differs from a distance between the second radiating element and the second electrode.

7. The antenna module according to claim 5,
wherein the first electrode has a mesh shape and includes a plurality of vias disposed in a direction normal to the substrate and a conductive member that interconnects adjacent ones of the plurality of vias, and
the second electrode has a flat-plate shape.

8. The antenna module according to claim 7,
wherein a center of the second radiating element is located closer to the second electrode than the first disposition surface in plan view in the direction normal to the second radiating element.

9. The antenna module according to claim 5,
wherein a center of the second radiating element is located closer to the first electrode than the first disposition surface in plan view in the direction normal to the second radiating element.

10. The antenna module according to claim 1, further comprising:
an anisotropic conductive member that connects the second main surface to the first disposition surface.

11. The antenna module according to claim 1, further comprising:
an underfill member that fills a gap between the second main surface and the first disposition surface.

12. The antenna module according to claim 1, further comprising:
a dielectric disposed on a surface of the first antenna disposition member that corresponds to a radiation direction of the second radiating element, the dielectric having a dielectric constant that differs from a dielectric constant of the first antenna disposition member.

13. The antenna module according to claim 12,
wherein the dielectric covers a surface of the first antenna disposition member that faces a side surface of the second radiating element.

14. The antenna module according to claim 1, further comprising:

a feed wiring line that includes a coaxial line and connects the first joint portion to the second radiating element.

15. The antenna module according to claim 1, wherein the feed wiring line that connects the first joint portion to the second radiating element further includes a first line and a second line connected diagonally to the first line.

16. The antenna module according to claim 1, further comprising:

a second antenna disposition member in which a third radiating element is disposed, wherein the second antenna disposition member has a second disposition surface on which the substrate is disposed and a second intersecting surface that intersects the second disposition surface, the second disposition surface is joined to the second main surface, and a feed wiring line that electrically connects the first radiating element or the third radiating element to the feed circuit includes a wiring line that spans the substrate and the second antenna disposition member in a second joint portion between the second main surface and the second disposition surface.

17. The antenna module according to claim 1, wherein the feed circuit is disposed on the substrate.

18. The antenna module according to claim 1, wherein the feed circuit is disposed on the first antenna disposition member.

19. A communication device comprising:

The antenna module according to claim 1.

20. The antenna module according to claim 1, wherein the feed circuit includes a power management circuit.

* * * * *